Sept. 17, 1935. J. FERGUSON 2,014,615
METHOD OF CONTROLLING CURRENT FLOW IN AN ELECTRIC
FURNACE AND ELECTRODE APPARATUS THEREFOR
Filed May 26, 1934
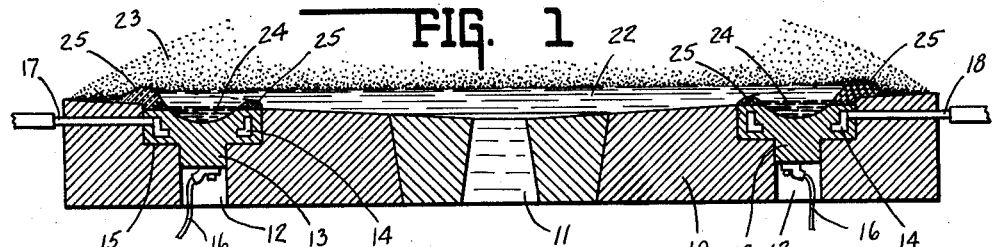
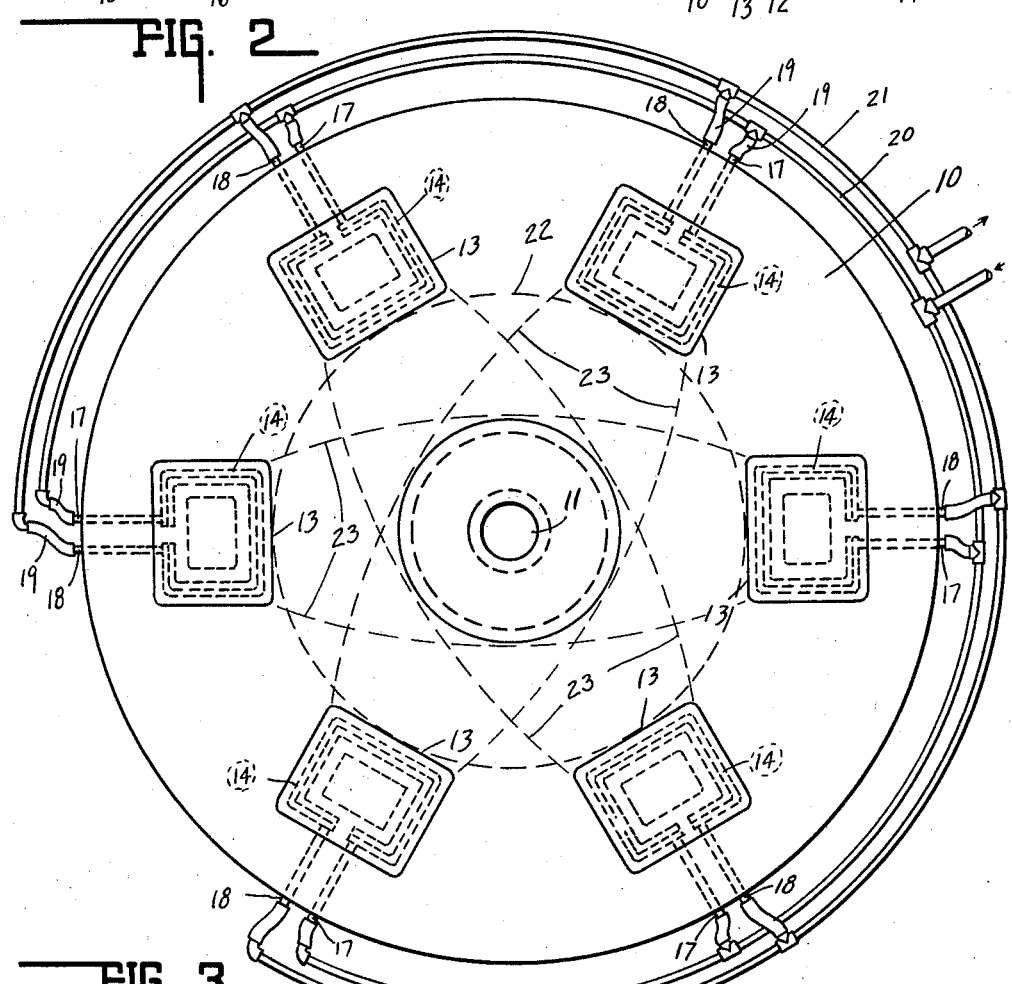
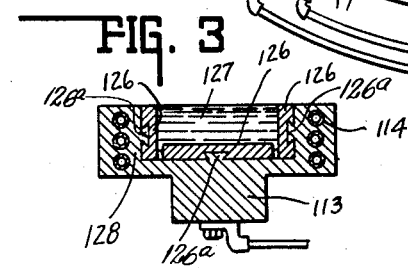
INVENTOR.
JOHN FERGUSON.
BY Lockwood Goldsmith & Galt
ATTORNEYS.

Patented Sept. 17, 1935

2,014,615

UNITED STATES PATENT OFFICE 2,014,615

METHOD OF CONTROLLING CURRENT FLOW IN AN ELECTRIC FURNACE AND ELECTRODE APPARATUS THEREFOR

John Ferguson, Indianapolis, Ind., assignor to Fairmount Glass Works, Inc., Indianapolis, Ind., a corporation Application May 26, 1934, Serial No. 727,681

16 Claims. (Cl. 13—6)

This invention relates to a method of controlling current flow in an electric furnace and electrode apparatus therefor, which is particularly useful in an electric glass furnace of the type disclosed in my copending applications, Serial No. 627,706, filed August 6, 1932 and Serial No. 696,373, filed November 2, 1933.

In the before-mentioned co-pending applications there is shown the use of molten lead as an electrode material in a glass furnace. The said material is contained in a metallic box having a refractory lining, the upper edges of said box being positioned considerably below the level of the furnace floor and being covered with refractory material to prevent the same from being melted by the heat of the furnace contents. The nature of molten lead is such that it easily penetrates any of the commercial refractories and for that reason the level of the lead cannot be carried above the level of the upper edges of the metallic electrode box. In the prior constructions, this level has been considerably beneath the level of the furnace floor and has thus resulted in the formation of a pool of stagnant molten glass above the electrode, which is objectionable for several reasons, the principal reasons being that the heat generated by the current passing through this stagnant glass is largely lost through radiation and conduction and performs no useful service. Furthermore, the stagnant glass in the well tends gradually to increase in resistance with a consequent greater heat loss.

Another undesirable feature of carrying the lead surface below the furnace floor resides in the fact that the electric current passing from the electrode follows a path close to the lip of the refractory material and, thus, causes disintegration and erosion of the refractory at this point, requiring frequent replacements.

In the present invention, one object is to bring the surface of the electrode material substantially to the level of the furnace floor and thus to eliminate the pool of stagnant glass and the erosive effect of the current upon the edge of the refractory lining.

A further object of the invention is to control the flow of current from the electrode to cause it to pass from the electrode at a level slightly above the furnace floor. It is at this level that the greatest heat is desired for melting the glass batch material. There is also much less erosion on the refractory furnace floor when the current path is maintained at a level above the floor.

These objects are attained by the use of a container for the electrode material which is set in the floor of the furnace with its upper edges substantially at the floor level and the said upper edges are artificially cooled to a temperature below their melting point. The temperature of the edges of the container is such as to chill and solidify a ridge of glass about the said edges which prevents passage of the electric current at the floor level and thus prevents erosion of the refractory floor and at the lip of the refractory material.

In the preferred form of the invention, the electrode container is formed of the same material as the electrode itself, preferably lead or lead alloy, and is provided with internal passages for the circulation of a cooling medium, such as water. By this means the entire electrode, box and all, may be formed integrally and set in place in the furnace. The heat of the molten glass conducted to the electrode serves to melt the central portion of the upper surface to provide the necessary electrical connection between the electrode and the molten glass while the cooling medium circulated through the passageways maintains the outer edges of the upper surface and the side walls thereof in a solid condition.

In certain cases, it is desirable to imbed in the material of the electrode a refractory material so positioned as to minimize heat transfer between the molten interior and the solid side walls thereof.

Another object of the invention is to control the current flow through the molten glass to give a maximum cross section of current path without unduly increasing the depth of the furnace. This is accomplished by placing the electrodes in opposed relation about the periphery of the furnace with their inner edges substantially straight and tangent to a circle concentric with the furnace and by using electrodes whose total inner face width equals a large percentage of the periphery of said circle. Current passing between opposite electrodes is thus caused to follow a path whose width is equal to or greater than the face width of the electrodes and, therefore, spreads over a large proportion of the furnace area.

Other objects and features of the invention will be understood from the accompanying drawing and the following description and claims:

Fig. 1 is a central vertical section through an electric furnace hearth showing two of the electrodes in place therein. Fig. 2 is a plan view of the same. Fig. 3 is a sectional view of the form of electrode having refractory heat insulation material imbedded therein.

In the drawing a furnace hearth 10 is illustrated provided with the usual discharge outlet 11 and having a plurality of electrode wells 12 formed therein. The said hearth may be covered by a hood, not shown. In each of the electrode wells there is provided an electrode 13 consisting originally of a block of lead or lead alloy having a water passage 14 formed therein and having its enlarged upper portion resting upon shoulders 15 formed in the refractory floor material. Electric conductors 16 are connected to the electrodes and are supplied with suitable current as shown in the said prior applications. Each of the electrodes is fitted with an intake pipe 17 and a discharge pipe 18 communicating with the passage 14 therein. The pipes 17 and 18 are connected by rubber tubing 19 or other suitable non-conducting conduits to a supply pipe 20 and a discharge pipe 21 which may be connected to any suitable source of circulating water.

In the operation of the furnace the molten glass 22 occupies a dish-shaped depression in the upper surface of the refractory floor and the glass batch material 23 is piled above the same. After the furnace has been put in operation, the conduction of heat from the molten glass to the electrode melts a portion 24 of the upper surface of the same, thus establishing efficient electrical connection between the electrode and the glass. The circulation of water through the pipes 17 and 18 and the passageways 14 maintains the upper edges of the electrode and the outer walls thereof in a solid condition and also cools the same sufficiently to chill and solidify a ridge 25 of glass about the edges of the electrode. This ridge of glass serves to prevent the current from the electrode from passing close to the furnace floor and thus protects the material thereof from erosion.

The electrode shown in Fig. 1 is formed with a cast interior passageway 14 but in Fig. 3 there is shown an electrode 113 in which the said passageways are formed by casting therein a coil 114 of tubing, preferably copper, accurately finished to give intimate contact with the electrode for heat transfer. In this form of the electrode there is imbedded therein a refractory lining 126 suitably anchored as by dove tails 126a to prevent floating in the molten lead. Because of the permeability of the refractory materials by molten lead, there is sufficient electrical connection between the interior portion 127 thereof and the outer portion 128. At the same time, the refractory lining 126 minimizes the heat transfer between said portions and thus minimizes the loss of heat through the circulating cooling medium.

From the foregoing, it will be seen that the construction shown in Fig. 1 may be considered either as an electrode box 13 containing a pool 24 of electrode material or as a complete electrode in itself. It will also be apparent that many of the advantages of the invention will be secured even though an electrode box of a different material than that of the electrode material is used so long as the upper edges of the box are cooled to prevent melting.

It will be apparent from Fig. 2 that the six electrodes in the furnace illustrated therein are located with their inner edges substantially straight and tangent to a circle 22 which is concentric with the furnace opening 11. The electrical connections are such that current passes between oppositely positioned electrodes and, with the electrodes so positioned, the inner faces of the electrodes of each pair are parallel to each other. Thus all points on the inner edge of a given electrode is equidistant from the edge of the corresponding electrode and there will be no tendency for a concentration of current at any one point. The current path thus occupies the entire front of each electrode and the current paths between electrodes, indicated by broken lines 23, cover a large part of the furnace area.

It will also be seen from Fig. 2 that the total width of the electrode faces is equal to a large percentage of the periphery of the circle 22. This fact, combined with the tangential arrangement of the electrodes, insures a wide distribution of current paths through the furnace. In practice, I have found that the total face width of the electrodes must be at least twenty-five percent and preferably greater than twenty-five percent of the periphery of circle 22 in order to prevent undue concentration of the current into relatively narrow paths.

Other variations of the invention within the scope of the appended claims will be apparent to those skilled in the art to which it pertains.

The invention claimed is:

1. In an electric glass furnace, the combination of a refractory hearth, a metallic electrode box therein with its upper edges substantially flush with the glass carrying surface of said hearth, means for maintaining the said edges of said box at a temperature below that of the glass material on the hearth, and electrode material contained in said box.

2. In an electric glass furnace, the combination of a refractory hearth, a metallic electrode box therein with its upper edges substantially flush with the glass carrying surface of said hearth, electrode material contained in said box, the edges of said box having internal passages for the circulation of a cooling medium, and means for supplying such a medium.

3. In an electric glass furnace, the combination of a refractory hearth, a metallic electrode box set therein with its upper edges in contact with the glass on said hearth, means for maintaining the said edges of said box at a temperature below that of the glass material on the hearth, and electrode material contained in said box.

4. In an electric glass furnace, the combination of a refractory hearth, a metallic electrode box set therein with its upper edges in contact with the glass on said hearth, electrode material contained in said box, the edges of said box having internal passages for the circulation of a cooling medium, and means for supplying such a medium.

5. In an electric glass furnace, the combination of a refractory hearth, and a metallic electrode therein with its upper surface in contact with the glass on said hearth, said electrode being formed of a material having a melting point lower than the temperature of molten glass and having internal passages for the circulation of a cooling medium so positioned that the circulation of such a medium therethrough maintains the edges of said upper surface below the melting temperature of said material while the central portion thereof is in the molten state.

6. In an electric glass furnace, the combination of a refractory hearth, and a metallic electrode therein with its upper surface substantially flush with the floor of the hearth, said electrode being formed of a material having a melting point lower than the temperature of molten glass, and having internal passages for the circulation of a cooling medium so positioned that the circulation of such a medium therethrough maintains the edges of said upper surface below the melting temperature of said material while the central portion thereof is in the molten state.

7. In an electric glass furnace, the combination of a refractory hearth, and a lead electrode therein with its upper surface in contact with the glass on said hearth, and having internal passages for the circulation of a cooling medium so positioned that the circulation of such a medium therethrough maintains the edges of said upper surface below the melting temperature of lead while the central portion thereof is in the molten state.

8. In an electric glass furnace, the combination of a refractory hearth, a lead electrode therein with its upper surface substantially flush with the floor of said hearth, and having internal passages for the circulation of a cooling medium so positioned that the circulation of such a medium therethrough maintains the edges of said upper surface below the melting temperature of lead while the central portion thereof is in the molten state.

9. An electrode for an electric furnace comprising a metal block having a lower melting point than the temperature of the furnace in which it is to be used, and having means for artificially cooling the side walls thereof to a temperature below said melting point while at least a portion of the interior thereof is in the molten state.

10. An electrode for an electric furnace comprising a metal block having a lower melting point than the temperature of the furnace in which it is to be used, and having means for artificially cooling the edges of the upper surface and side walls thereof to a temperature below said melting point while the central portion of said upper surface is in the molten state.

11. An electrode for an electric furnace comprising a lead block, and having means for artificially cooling the side walls thereof to a temperature below the melting point of lead while at least a portion of the interior thereof is in the molten state.

12. An electrode for an electric furnace comprising a lead block, and having means for artificially cooling the edges of the upper surface and side walls thereof to a temperature below its melting point while the central portion of said upper surface is in the molten state.

13. An electrode for an electric furnace comprising a metal block having a lower melting point than the temperature of the furnace in which it is to be used, having means for artificially cooling the side walls thereof to a temperature below said melting point while at least a portion of the interior thereof is in the molten state, and having refractory heat insulating material imbedded therein in position to minimize heat transfer from the interior to said side walls.

14. An electrode for an electric furnace comprising a metal block having a lower melting point than the temperature of the furnace in which it is to be used, having means for artificially cooling the edges of the upper surface and side walls thereof to a temperature below said melting point while the central position of said upper surface is in the molten state, and having refractory heat insulating material imbedded therein in position to mimimize heat transfer from the molten portion to said side walls.

15. The method of controlling current flow from an electrode set in the floor of an electric glass furnace consisting in artificially cooling an edge of the electrode sufficiently to solidify the glass in contact therewith to a substantial height above the furnace floor, whereby the current from said electrode is forced to pass therefrom at a level above the furnace floor.

16. The method of controlling current flow from an electrode set in the floor of an electric furnace consisting in artificially solidifying the glass adjacent an edge of said electrode to a substantial height above the furnace floor, whereby the current from said electrode is forced to pass therefrom at a level above the furnace floor.

JOHN FERGUSON.